United States Patent [19]
Autrey

[11] 3,852,707
[45] Dec. 3, 1974

[54] SONAR BROADBAND CONSTANT BEAMWIDTH SHADING NETWORK

[75] Inventor: Samuel W. Autrey, Fullerton, Calif.

[73] Assignee: The United States of America as represented by the Secretary of the Navy, Washington, D.C.

[22] Filed: Feb. 23, 1968

[21] Appl. No.: 707,595

[52] U.S. Cl. .................................. 340/6 R, 340/6 S
[51] Int. Cl. .............................................. G01s 3/80
[58] Field of Search ...................... 340/6, 6 S, 16, 9

[56] References Cited
UNITED STATES PATENTS
3,412,372  11/1968  Ladstatter .............................. 340/6

Primary Examiner—Richard A. Farley
Attorney, Agent, or Firm—Richard S. Sciascia; Arthur A. McGill; Prithvi C. Lall

[57] ABSTRACT

A beamwidth shading network disposed between a beamformer and the point at which the delayed inputs are summed or the point at which the beam is formed, which includes for each hydrophone in the array a multiplier, a compensating delay and a transverseal filter. The transversal filters provide a weighting function for the associated input so that, with the proper weighting function applied, the beam is shaded and forms an essentially rectangular beam pattern for a line array over a broadband of frequencies.

3 Claims, 14 Drawing Figures $k$ VERSUS $y_0$

SONAR BROADBAND CONSTANT BEAMWIDTH SHADING NETWORK

BACKGROUND OF THE INVENTION

1. Field of Invention

The present invention relates to a system for beam pattern forming and more particularly pertains to element weighting networks for shading an array pattern to provide a rectangular beam over an extended frequency range.

2. Description of the Prior Art

Many investigators have dealt with the problem of achieving a specified beam pattern with a line array, basing their syntheses on the Fourier series nature of the patterns obtained with equally spaced array elements, or using the Fourier transform pair relationship of the beam pattern and the illumination in continuous arrays. These and later works have generally been of a theoretical nature with the design frequency fixed; i.e., implicit single frequency studies.

When the braodband problem is studied the theoretical aspects of the Fourier transform pair are invariably overlooked in favor of apparent and attractive approximating techniques. In one such technique a broad beam is generated by summing a large number of beams steered to different directions. In its simplest form the scheme yields beamwidths that are not constant with frequency, but with modifications equivalent to varying the steering angles of the constituent beams as functions of frequency, the summed beamwidth can be maintained approximately constant over several octaves. The formed beams must be properly delayed before summation in order to relate them all to the same reference, i.e., they must appear to have been formed from arrays with coincident phase centers. In other approaches the same basic idea was implemented theoretically with a number of line arrays all lying in the same plane and having the same midpoint. This technique was then extended to the formation of beams essentially constant in width in two dimensions with a twisted planar array.

Other techniques include shaping the surface of the transducer to produce the desired pattern directly (which is actually what is done with the twisted planar array), varying the effective aperture as with low pass filters or a multiplicity of resonant arrays, but apart from the twisted array they have not been pursued to any successful conconslusions.

SUMMARY OF INVENTION

The general purpose of this invention is to provide a broadband constant beamwidth radiation pattern through the employment of various shading networks. The present invention provides a unique frequency selective network for each hydrophone, which network includes a multiplier, a delay and a transversal filter having a specific number of tapped delays.

An object of the present invention is to provide a beam forming network that permits any array factor vs. azimuth vs. frequency characteristics with an arbitrarily close approximation.

Another object is to provide a beam forming network in which the beam patterns are directly synthesized and digital circuitry can be employed.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts, wherein.

DESCRIPTION OF A PREFERRED EMBODIMENT

In the application of hydrophone line arrays in underwater sound programs, it has become increasingly important to control the beam patterns over broad (percentage) bands of frequency. One beam pattern having application to many problem areas is that in which the beam width is maintained essentially constant over a broadband. It should be noted that the shading network affects only the beam pattern and not the direction in which the beam is steered. Steering is performed by progressively delaying the hydrophone outputs so that they all add in phase for sound waves from the preferred direction. This steering, or progressive delay of the inputs, takes place in the beamformer, which may form a large number of beams either simultaneously or sequentially. The shading network usually lies between the beamformer and the point at which the delayed inputs are summed, i.e., the point at which the beam is actually formed. The array geometry and the shading network determine the beam pattern.

Since the beam pattern and the illumination (or element weighting for discrete sensors) constitute a Fourier transform pair, maintaining a constant beam pattern as a function of frequency requires that the illumination be constant as a function of frequency, i.e., that the array aperture in wavelengths and the relative weighting over that aperture be constant with frequency. Since the physical dimensions of the array are not frequency dependent, the effective physical length must be made to vary inversely with frequency to maintain an essentially constant aperture in wavelengths. This must be accomplished with the element weighting networks that constitute the array shading network. Thus, at low frequencies all of the array elements must contribute substantially to the summed beam, but as the frequency increases those elements near the end of the array must contribute less and less to the sum. At the highest frequency of interest, only those elements near the center of the array should be making any substantial contribution to the beam summation.

Figure 1:
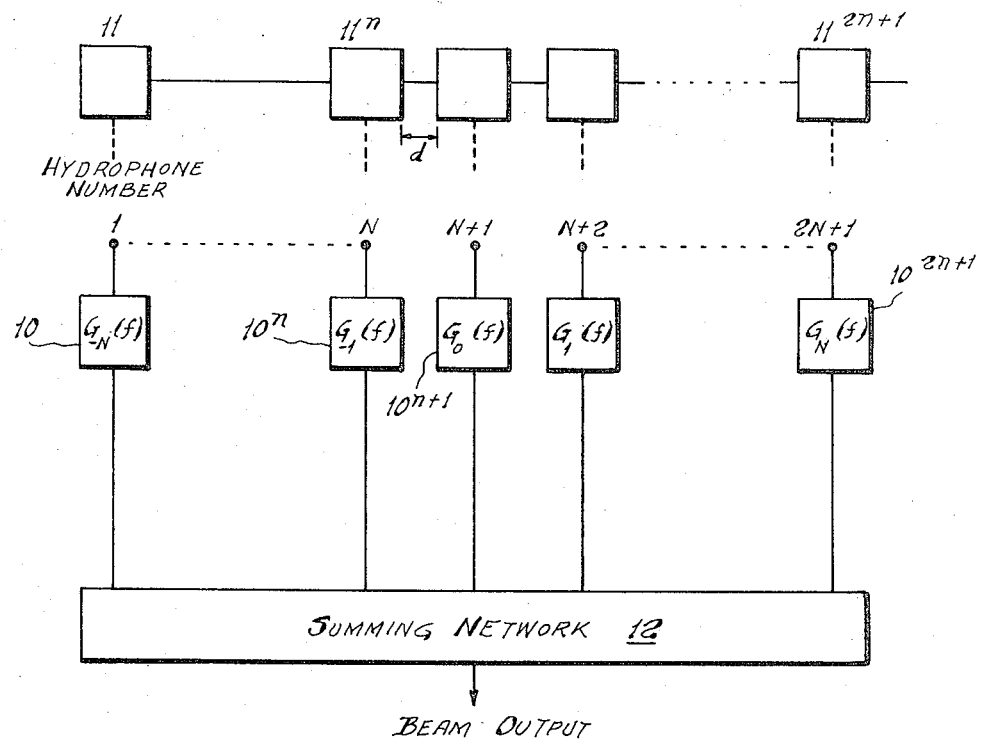
FIG. 1 is a block diagram of an ideal array shading network.

The required array shading network thus consists of frequency selective networks 10 [$G_n(f)$], one per hydrophone 11 as shown in FIG. 1 with the output hereof applied to the summation network 12.

This array has 2N+1 equally spaced hydrophones; this numbering system was chosen for a convenience to be seen at a later point. The $G_n(f)$ must generally decrease with frequency to reduce the effective physical length of the array with frequency. As an example, suppose the array is made symmetrical about the midpoint and that the element weighting functions are as given by equation (1) below:

$$G_n(f) = G_{-n}(f) = \sin(n\pi f\tau)/n\pi f\tau \quad (1)$$

Some of these frequency dependent hydrophone weighting functions are illustrated in FIG. 2 and with this shading network, the array output, $S(f,\psi)$, is readily determined as the sum of the weighted hydrophone outputs. This summation is most easily evaluated in terms of the progressive phase shift between input signals, $\psi$.

$$\psi = f/fd \; \pi \sin\psi = \omega d/c \sin\psi \quad (2)$$

Here $d$ is the hydrophone spacing, $c$ is the velocity of propagation, $\psi$ is the energy arrival angle, and $f_d$ is the frequency for which the spacing is one-half wavelength. Evaluation of the sum is greatly simplified when all phase shifts are referenced to that of the center hydrophone.

$$s(f,\psi) = G_0(f) + G_1(f)e^{i\psi} + G_{-1}(f)e^{-i\psi}$$
$$+ \ldots + G_N(f)e^{iN\psi} + G_{-N}(f)e^{-iN\psi} \quad (3)$$

$$= G_0(f) + 2\sum_{n=1}^{N} G_n(f)\cos n\psi \quad (4)$$

$$= 1 + 2\sum_{n=1}^{N} \frac{\sin(n\pi f\tau)}{n\pi f\tau} \cos n\psi \quad (5)$$

$$= 1 + 2\sum_{n=1}^{N} \frac{\sin(n\pi f\tau)}{n\pi f\tau} \cos\left(n\pi \frac{f}{fd} \sin\psi\right) \quad (6)$$

Figure 3A:
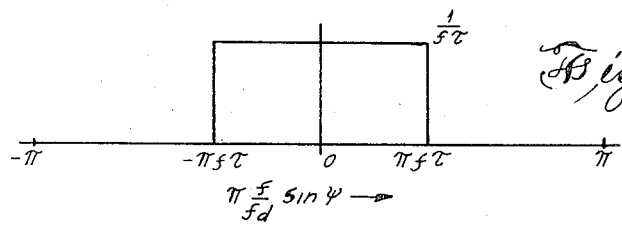
FIGS. 3(a), 3(b) and 3(c) illustrate the beam patterns resulting from various weighting functions.

This is recognized as the first N+1 terms of the Fourier series expansion of the function shown in FIG. 3a, which has a period of $2\pi$.

Figure 3B:
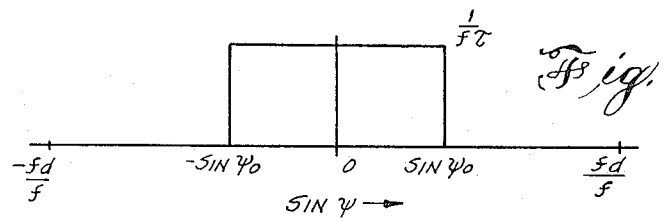

FIG. 3b follows from FIG. 3a by substituting (sin $\psi_0$)/$f_d$ for $\tau$ and dividing the variable and the abscissa by $\pi f/f_d$. FIG. 3b results from a further change of scale.

Figure 3C:
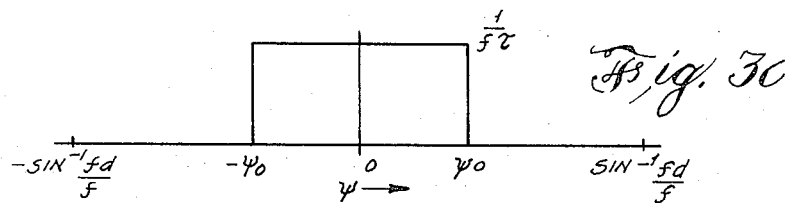

Thus, the weighting functions of equations (1) and FIG. 2 result in the beam pattern of FIG. 3c if an infinite number of array elements are used. With a finite number of elements, the beam pattern will be essentially as shown but contain ripples. Note that the amplitude of the beam output is inversely proportional to frequency. This has no effect on the pattern and may readily be compensated, e.g., by following the shading network with a single RC network.

Figure 4:
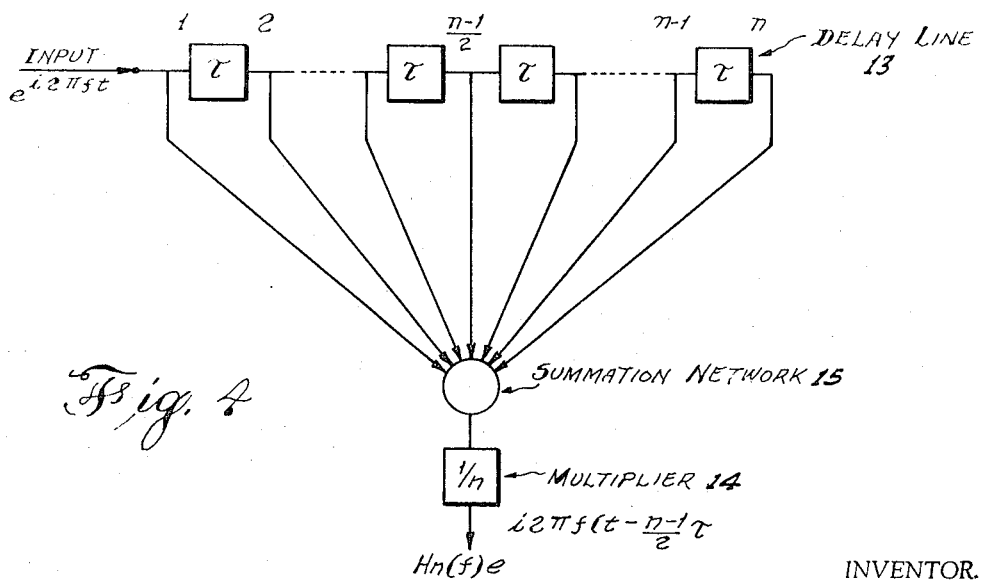
FIG. 4 is a block diagram of a simplified weighting network.

The required frequency functions may be approximated by networks such as that of FIG. 4, which is simply a delay line 13 with $n-1$ sections. The output must be normalized to unity by multiplying by $1/n$ at multiplier 14; otherwise, the $n$ taps of unity weighting result in an output of magnitude $n$.

This summation carried out at 15 results in a delay equal to that at the midpoint and a magnitude characteristics, $H_n(f)$.

$$H_n(f)e^{-i2\pi f\tau(n-1/2)} = 1/n[1 + e^{-i2\pi f\tau} + e^{-i2(2\pi f\tau)}$$
$$+ \ldots + e^{-i(n-1)(2\pi f\tau)}] \quad (7)$$

$$H_n(f)e^{-i(n-1)\pi f\tau} = 1/n[(1-e^{-i2n\pi f\tau})/(1-e^{-i2\pi f\tau})] \quad (8)$$

$$H_n(f) = 1/n[(e^{in\pi f\tau} - e^{-in\pi f\tau})/(e^{i\pi f\tau} - e^{-i\pi f\tau})] = \sin n\pi f\tau/n \sin \pi f\tau \approx \sin f\tau/n\pi f\tau \quad (9)$$

Alternatively, $H_n(f)$, could have been expressed in a manner to exhibit its Fourier series nature. For $n$ odd:

$$H_n(f) = 1/n[1 + e^{i2\pi f\tau} + e^{-i2\pi f\tau} + \ldots + e^{i(n-1/2)2\pi f\tau} + e^{-i(n-1/2)2\pi f\tau}] \quad (10)$$

$$H_n(f) = \frac{1}{n}\left[1 + 2\sum_{k=1}^{\frac{n-1}{2}} \cos(2kn f\tau)\right] \quad (11)$$

Thus, the $H_n(f)$ realized with the simple tapped delay line yields a very good approximation to the required weighting functions, the $G_n(f)$. For $f\tau$ less than 0.25, the error is less than 10 percent. Thus, since $\tau = \sin\psi_0/fd$, the error is less than 10 percent for $\sin\psi_0 = 0.25$ at the design frequency of the array, i.e., $f=f_d$.

Figure 5:
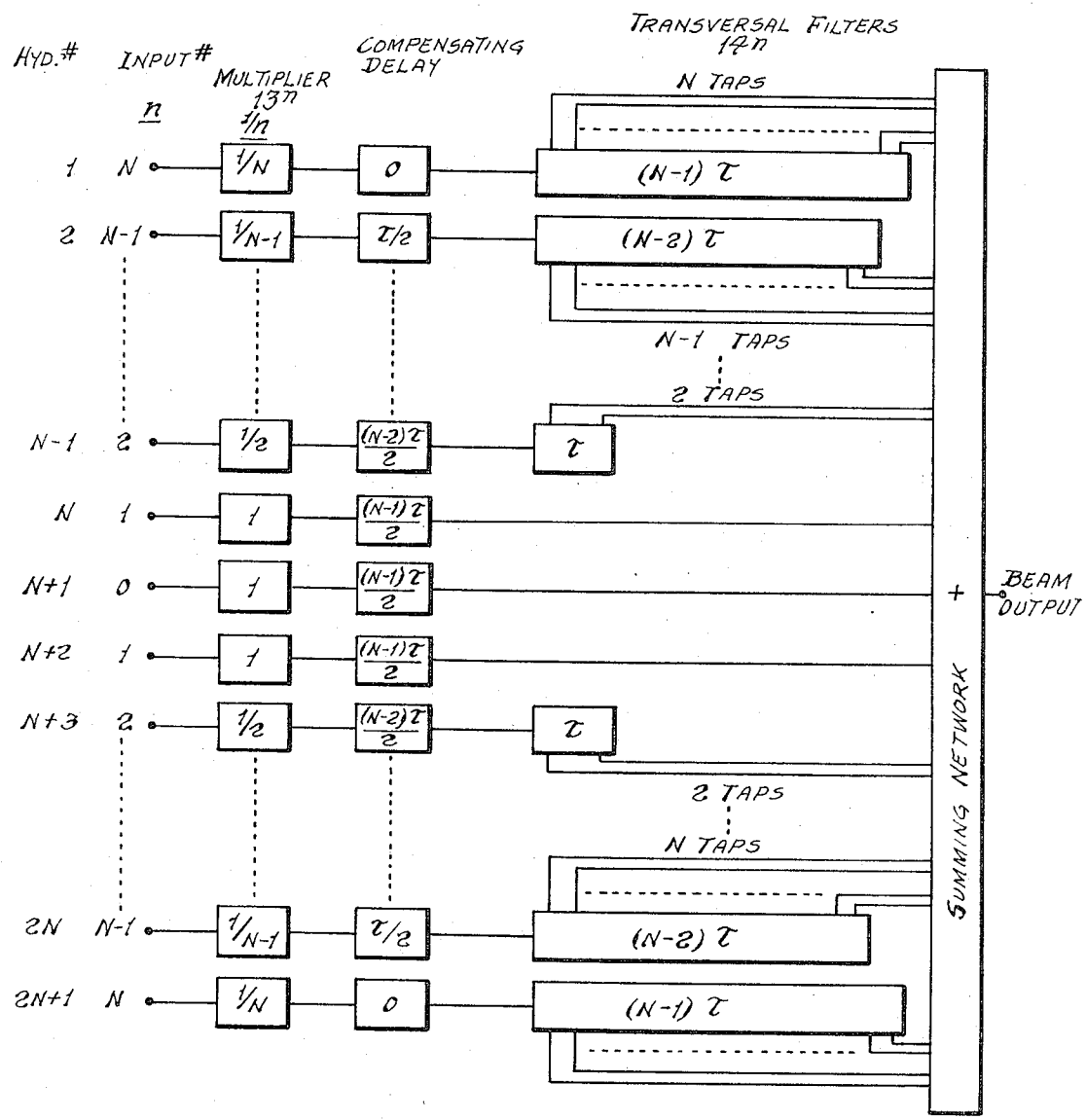
FIG. 5 is a block diagram representing a shading network for providing constant bandwidth.

Hence, a very good approximation to a constant beamwidth over a broadband of frequencies is achieved with the shading network of FIG. 5. Note that the normalizing factor $1/n$ where $n$ is the input terminal designation for 2N+1 hydrophones is applied at each input, by the multiplier $13^n$ as is the delay $16^n$ required to compensate for the different lengths of the tapped delay lines. The latter have been labeled "transversal filters" $14^n$, since this is their common name in such applications.

Considering an array having 50 hydrophones with a half wavelength spacing frequency of $f_d$. The wide beam characteristics desired are constant response $\pm 0.5$ db from $f_d/8$ to 1.5 $f_d$, i.e., 12:1, for four different beam widths, hereafter called beam factors of 3.8°, 6.2°, 8.2° and 14.2°.

In this approach all of the tap points of the transversal filters were given equal weights yielding a sin $x/x$ frequency characteristics, but it is clear that any arbitrary frequency characteristic may be approximated as closely as is desired by letting the taps have different weightings, and the resulting transmission will be a Fourier series in frequency, as in equation (11) in which all of the coefficients are two, leading to tap values of unity. This may lead to very long delay lines, however, and large numbers of taps for accurate representation of complex functions. In any event, the implementation is simplified and made more accurate when the delay lines are made digital in nature. This requires that the inputs be characterized by one-bit pulse trains. Thus, they may be infinitely clipped, and all of the operations remain linear for the signals in the low S/N ratio case, or they may be delta modulated, in which case all of the operations commute with the demodulation process, so they may be thought of as operating on analog signals. The latter approach, with the constant beamwidth equipment, is described herein.

A more sophisticated beam pattern approximation was also made in the design actually implemented. In the foregoing paragraphs a design was postulated and then analyzed. It is now clear that this design could have been synthesized by making a Fourier series expansion of the desired beam pattern (FIG. 3c) to determine the required weighting functions (FIG. 2 and equation (1)), and then those weighting functions could have been synthesized by making Fourier series approximations to them (equation (11)), and then those approximations could be realized in transversal filters (FIG. 4).

Figure 6:
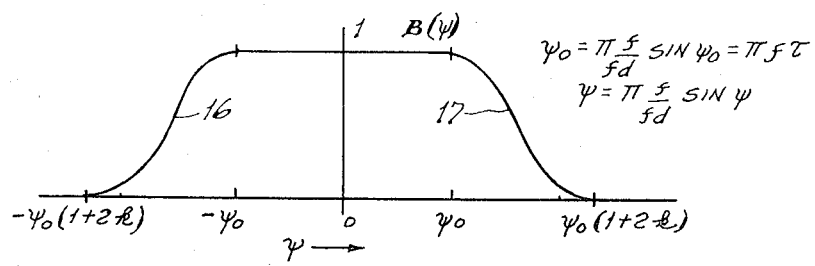
FIG. 6 is a graphical plot of the beam pattern attained for an array employing the shading network of FIG. 5.

The beam pattern, B ($\psi$) (15) is shown in FIG. 6. It is constant out to $\pm \psi_0$ and zero beyond $\pm(1+2k)\psi_0$, the transition region is spanned by two parabolic sections 16, 17, and the slope is continuous throughout the entire interval.

The Fourier series expansion F($\psi$), of B($\psi$) for an even number of array elements is obtained in the usual manner.

$$F(\psi) = \frac{2\psi_0(1+k)}{\pi} \sum_{n=1}^{N} \frac{\sin\left(\frac{2n-1}{2}\right)(1+k)\psi_0}{\left(\frac{2n-1}{2}\right)(1+k)\psi_0} \left[\frac{\sin\frac{(2n-1)k\psi_0}{4}}{\frac{(2n-1)k\psi_0}{4}}\right]^2 \cos\left(\frac{2n-1}{2}\right)\psi \quad (12)$$

Figure 7:
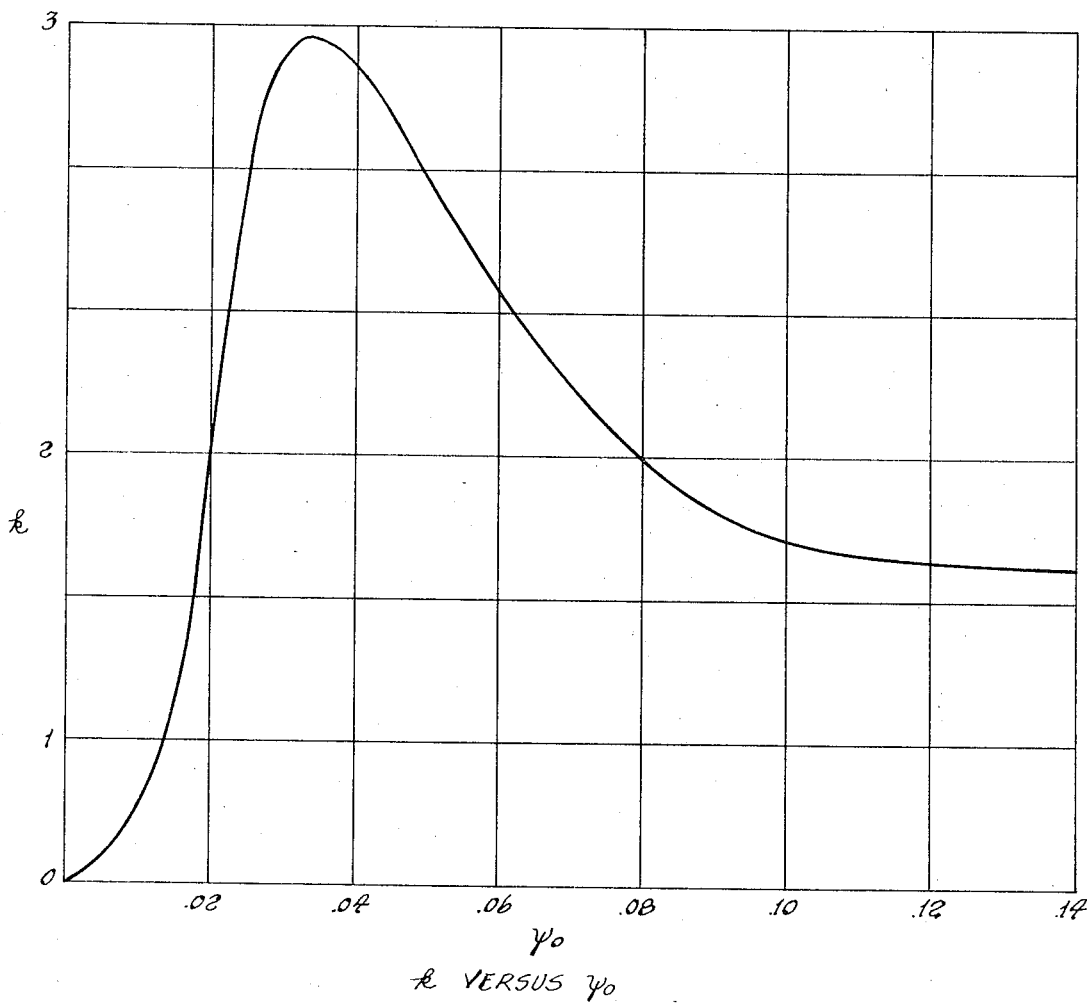
FIG. 7 is a plot of the angular variable of FIG. 6.

Hence, each hydrophone must be weighted by a sin x/x ·[(sin y)/(y)] function or frequency. These functions were obtained by Fourier series approximations arbitrarily limited to a dc term and 12 harmonics in order that circuit boards could be readily fabricated. It developed that this restriction limited the accuracy of the approximation for the 14° beam, and it was found necessary to permit k of equation (12), i.e., the transition width, to vary as a function of frequency to maintain good beam patterns. A plot of k versus $\psi_0$ is given in FIG. 7, following the summary.

Figure 8:
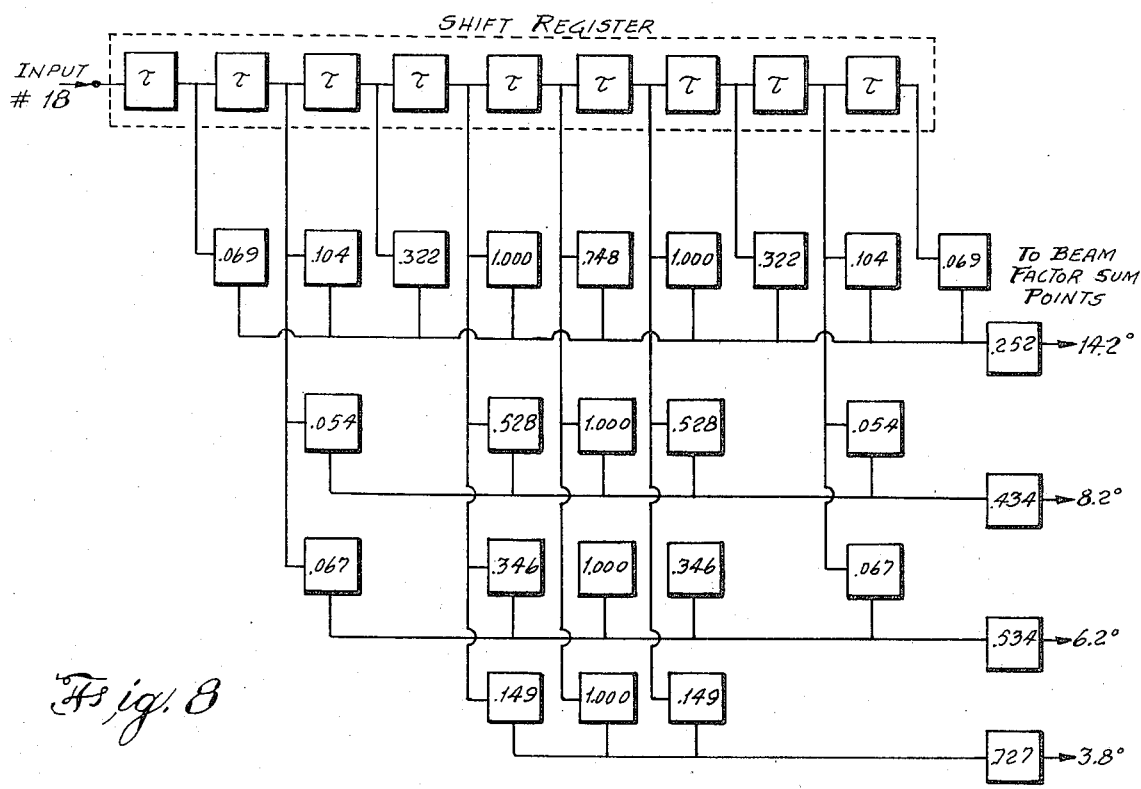
FIG. 8 is a block diagram of a typical transversal filter showing the various tap values; and, FIG. 9 is a graph of weighting functions for two specific hydrophones.
Figure 2A:
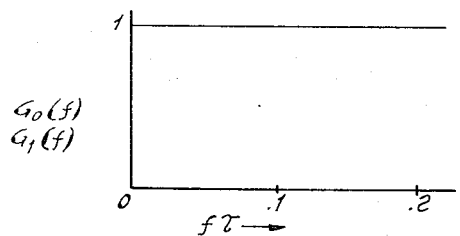
FIGS. 2(a), 2(b), 2(c) and 2(d) are graphic illustrations of frequency dependent hydrophone weighting functions.
Figure 2B:
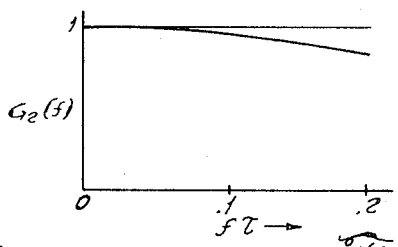
Figure 2C:
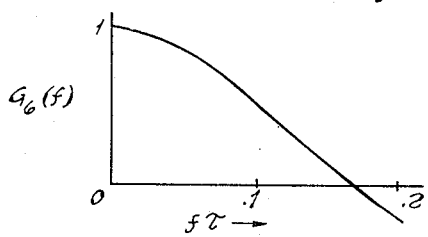
Figure 2D:
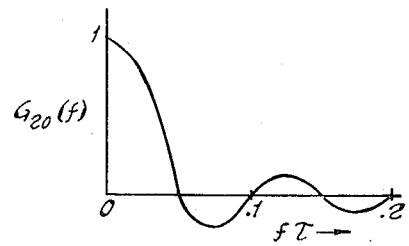

The coefficients of the Fourier series expansions of the weighting functions were determined, i.e., the transversal filter tap values. The resulting tap values were rounded off, and all taps less than 5 percent of the maximum tap on any single filter were set equal to zero. The hydrophones are numbered 1 at each end of the array and 25 at the middle; the maximum tap value column corresponds to the multipliers preceeding the delay lines of FIG. 5; and the design tau corresponds to that of FIG. 3, but with a different scale factor. The actual delay between taps is the same for all four beam factors and is determined by the frequency interval over which the weighting functions are approximated, dc to 1.5 $f_d$, and hence, is 1/(3fd). Thus, each hydrophone has one delay line (actually a shift register) with four sets of taps, one for each beam factor. As an example, the transversal filter for hydrophones number 18 is as shown in FIG. 8. An identical network is also used for hydrophone number 33.

The required multiplications are achieved in a resistor matrix; voltage sources at the tap points drive through this matrix to four low impedance summing points, where the four beams are formed, just as the single beam was formed in FIG. 5. The delay prior to the first tap used is the seven blocks of delay in which the unused taps 1 through 7 reside.

Figure 9:
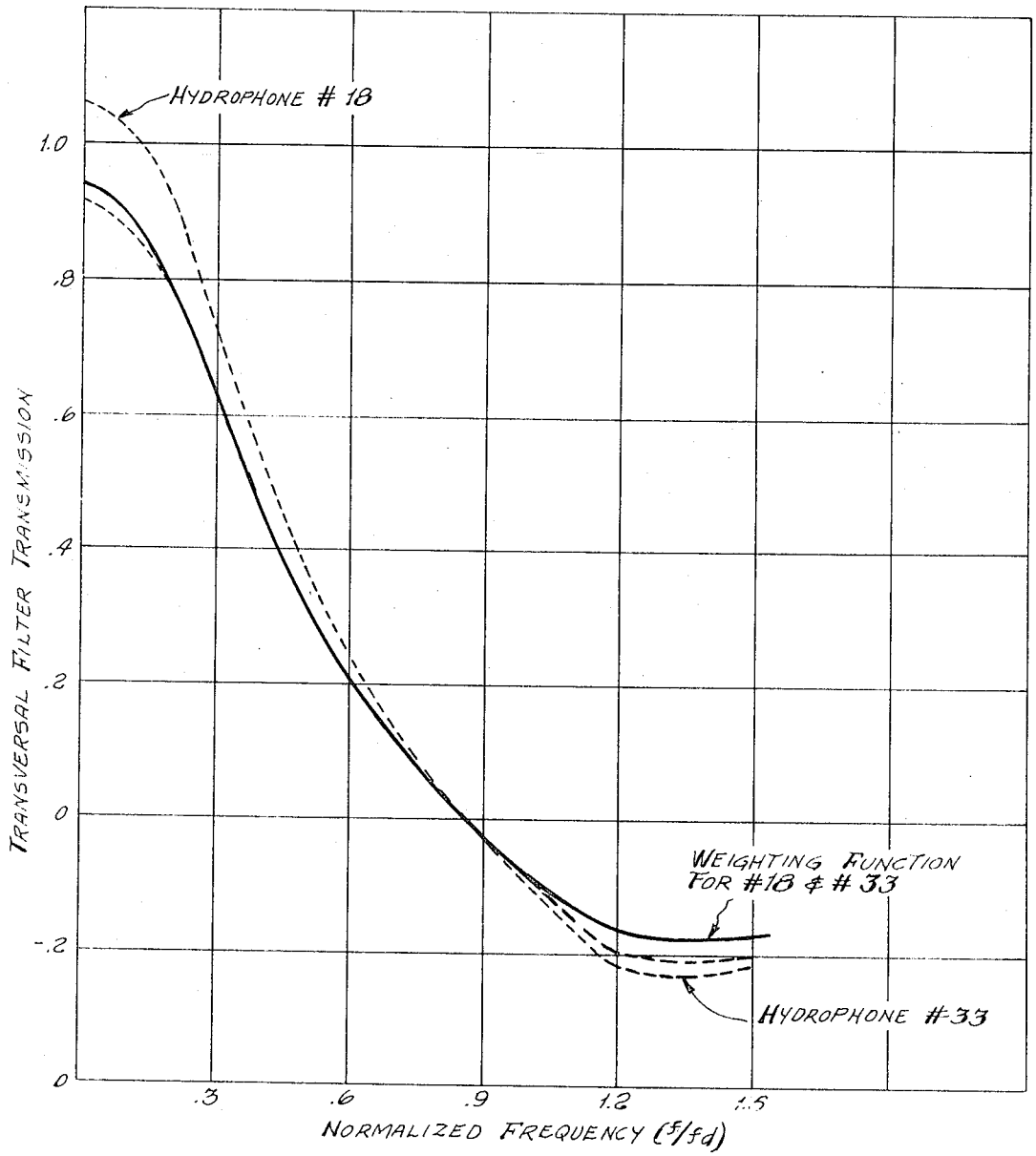

FIG. 9 shows the weighting function desired for hydrophones number 18 and 33 — for the 14.2° beam factor only — and the functions actually achieved with the two networks designed as in FIG. 8. This is the measured transmission from the input to the output of FIG. 8. The signals were delta modulated with a sample period of $\tau/16$; thus, the taps were located at 16-bit intervals on the shift register that constituted the delay line. In the actual implementation all of the hydrophones signals were time division multiplexed onto a pair of delay lines and gated off at appropriate times. This strategem was employed simply to take advantage of the large numbers of bits available in small packages of the shift registers.

The tap values were computed and used to compute the outputs of the complete shading network for each of the four beam factors as functions of azimuth and frequency. The amplitude in the main lobe was generally constant to within $\pm 0.5$ db over the frequency range from $f_d/8$ to 1.5 $f_d$. About 15 percent variation in beamwidth was noted for the broadest beam, the variation being higher for the narrow beams because the aperture is not large enough to yield the narrower beams at the lower frequencies. The maximum theoretical sidelobes for the narrow beam factors range from −13 db at the lower band edge through about −27 db at the geometric mid-frequency to about −33 db at the upper band edge. For the broad beam factors, the sidelobe structure were generally over 24 db down. Measured data agree well with the theoretical performance, with broadband sidelobes generally over 20 db down from the main lobe.

It will be understood that various changes in the details, materials, and arrangements of parts (and steps), which have been herein described and illustrated in order to explain the nature of the invention, may be made by those skilled in the art.

I claim:

1. In a linear equispaced hydrophone array of 2N+1 hydrophones connected to a beamformer, a beamwidth shading network disposed between said beamformer and a summing network which comprises:
   an input terminal for each output of said beamformer corresponding to one of said hydrophones, said input for the center reference hydrophone being designated as "O" and each of said terminals being designated by the number of terminals therebetween including said reference terminal, the end terminals being designated N,
   a linear series connected signal path for each of said input terminals which includes,
   a multiplier having a factor 1/n, where n designates said input terminal except said center terminal having a factor of unity, a compensating delay of $((N-n)/2)\tau$, where $\tau =$ sine of the energy arrival angle divided by the frequency for which the spacing of adjacent hydrophones is one-half wavelength, a linear delay means having a total delay of $(n-1)\tau$ and $n$ equal tap outputs, said tap outputs connected to the input of said summing network.

2. The network according to claim 1 wherein said linear delay means is a shift register.

3. The network according to claim 1 wherein said linear delay means is a transversal filter.

* * * * *